Aug. 11, 1931. C. F. H. BOHNHARDT 1,818,295
TANK TRUCK GAUGE
Filed June 18, 1928
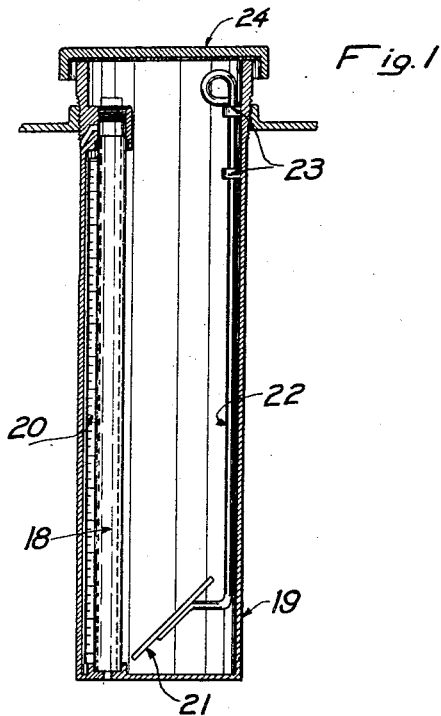
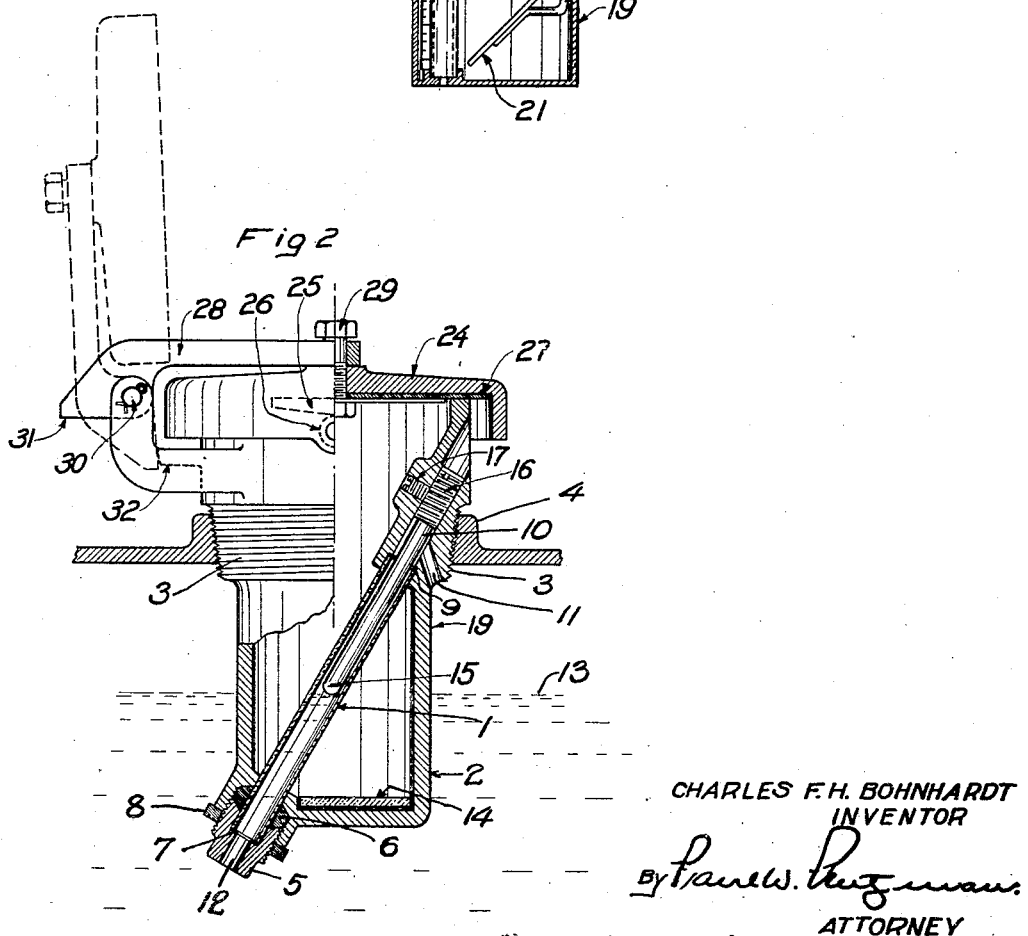
CHARLES F. H. BOHNHARDT
INVENTOR
ATTORNEY Patented Aug. 11, 1931

1,818,295

UNITED STATES PATENT OFFICE

CHARLES F. H. BOHNHARDT, OF LYNWOOD, CALIFORNIA

TANK TRUCK GAUGE

Application filed June 18, 1928. Serial No. 286,261.

My present invention relates to the art of determining the level of a liquid with regard to some reference point or plane for the purpose of measuring its volume. My invention relates especially to volume determinations on tanks which are used for transporting volatile liquids, such as gasoline.

It is an object of my invention to provide a gauge which cannot be tampered with, also a gauge which is sealed at all times and which has no moving parts actuated by the rise or fall of the liquid in the tank.

I attain these and other objects by the mechanism illustrated in the accompanying drawings in which:

Fig. 1 is a sectional elevation of one embodiment of my improved gauge and Fig. 2 is an elevation, partly in section, of a second embodiment of my improved gauge, both utilizing the same novel principles of construction which characterize my invention.

Referring to Fig. 2, a transparent tube 1 is secured in the cuplike container 2 which is threaded at 3 to screw into the collar 4. The transparent tube is preferably a piece of ordinary cylindrical gauge glass and is sealed into the cup by suitable packing. In this instance the gland 5, packing 6, washer 7, and locknut 8, prevent liquid from leaking around the tube into the cup at the lower end, while the washer 9 prevents leakage around the top end of the tube into the cup. Passages 10 and 11 vent the upper end of the tube back into the interior of the tank, and aperture 12 through the gland 5 opens the lower end of the tube to the interior of the tank. The gauge glass then forms a transparent passage through and across the cup in such manner that when the cup is partially immersed in a liquid as indicated at 13, the liquid rises freely in the glass and is clearly observable by a person looking down into the cup. A mirror 14 is set in a suitable plastic on the bottom of the cup with its reflecting surface up to enhance the light and to consequently improve the visibility of the liquid in the glass.

Liquid level indicators used on truck tanks employed in tank load delivery of gasoline have a function different from that of gauges used on tanks employed in the delivery of gasoline in less than tank loads. Gauges of the first class need only determine when the liquid has reached a predetermined height at which point the volume of the tank is known, a reading of the quantity in a partly filled tank not being required. Gauges in the second employment must not only determine when the tank is full but must also determine the volume at partial loads.

The indicator shown in Fig. 2 is designed primarily for use on tanks which are employed in transporting liquid in full tank loads. For this reason it is provided with a single fixed marker 15 consisting of a metal rod with an upset end 16 adapted to screw into the cup and extend into the gauge glass. When the liquid rises in the glass as the tank is filled, its level in the glass is seen as an iridescent concave surface, which will abruptly break into an annular meniscus when it touches the end of the marker. The tank is then full to the proper level and the operator stops the flow of the liquid into the tank. Limited adjustment of the marker is provided for in the threads on the upset end 16, after which the set-screw 17 can be tightened and jammed, making the location of the marker permanent.

The liquid level indicator illustrated in Fig. 1 is designed primarily to meet the conditions of less than tank load delivery. This gauge has a transparent tube 18 and a cup 19 similar to those just described, except that the cup is more elongated and the gauge glass runs substantially parallel with it along one side. The tube 18 is sealed into the cup 19 for the same purpose that the tube 1 is sealed into the cup 2, that is to prevent liquid from entering the cup while permitting it to rise in the gauge glass. The purpose of the gauge in Fig. 1 being to determine the liquid level at different heights, it is provided with the scale 20 secured to the cup behind the gauge glass and with a mirror 21 carried on a rod 22. Guides 23 constrain this rod to travel in a line parallel with the gauge glass. The mirror is set at an angle of substantially 45° to the axis of the gauge glass. An operator can then see an image of the glass and the scale behind it by looking straight down into the mirror. By then simply drawing up the rod until the mirror is directly opposite the liquid level in the glass the height of the liquid can be read on the scale, and by reference to a calibration table the corresponding volume can be determined.

The chief disadvantage of a gauge glass on a tank containing inflammable liquid is that, even though partially protected, it might be broken or the packed joints might leak. In my improved gauge the glass is contained in a cup which prevents the escape of any liquid in the event of either glass breakage or leakage of the joints. To render my gauge still more safe the cups are provided with gas tight covers 24, which may be of any suitable type, a preferred cover being shown in Fig. 2. Here the cover is secured to the cup by the interrupted thread indicated at 25 and mating rollers 26 revolving on lugs projecting from the sides of the cover. A suitable gasket 27 provides packing between the cover and the top of the cup. To facilitate handling this cover and to prevent accidental damage, it is carried on the hinged lever 28, in such manner that it may be tipped back as indicated in the dotted lines of Fig. 2. Lever 28 is secured to the cover by the bolt 29, which is threaded into the center of the cover to form a gas tight connection, and is pivotally secured through the lever; the lever in turn is pivoted on pin 30. Shoulder 31 contacts with lug 32 when the cover is open and prevents it from passing farther than is necessary for stability. In this manner the cover is protected from damage, and possible loss. When the cover is in position on the cup the gauge is externally sealed and completely safeguarded. Obviously such a cover can be applied to the gauge illustrated in Fig. 1.

In Fig. 1 it is to be noted that the rod and the mirror carried by it are entirely contained in the cup when not in use, and in such manner that it does not hinder the application of the cover.

Though I have described my improved truck tank gauge with particular reference to tanks mounted on motor trucks, it is apparent that it can be applied to railroad tank cars and to many other tanks and containers, and I do not limit myself to the particular embodiment or use herein set forth except as limited by the following claims.

I claim as my invention:

1. A liquid level indicator for a closed tank, comprising: a cup adapted to project downwardly into the closed tank, said cup being liquid tight except at its upper end; a transparent tube obliquely traversing said cup and communicating with the space within said tank and without said cup; there being an opening in the bottom of said cup cooperating with said tube to admit liquid into said tube; means for nonleakably sealing said tube into the walls of said cup; a solid body projecting downwardly within said tube for contacting with the surface of liquid rising within said tube; light reflecting means in said cup; and means for closing the upper end of said cup.

2. A liquid level indicator for a closed tank, comprising: a cup adapted to project downwardly into the closed tank, said cup being liquid tight except at its upper end; a transparent tube traversing said cup and communicating with the space within said tank and without said cup; there being an opening in the bottom of said cup cooperating with said tube to admit liquid into said tube; means for nonleakably sealing said tube into the walls of said cup; and a solid body projecting downwardly within said tube for contacting at a predetermined level with the surface of liquid rising within said tube.

3. A liquid level indicator for a tank, comprising: a cup adapted to project downwardly into the tank, said cup being liquid tight except at its upper end; a transparent tube traversing said cup and communicating with the space within said tank and without said cup; there being an opening in the bottom of said cup cooperating with said tube to admit liquid into said tube; means for nonleakably sealing said tube into the walls of said cup; means for visually ascertaining the level of liquid rising within said tube, and means for closing the open end of said cup.

4. A liquid level indicator for a tank, comprising: a cup adapted to project downwardly into the tank, said cup being liquid tight except at its upper end; a transparent tube traversing said cup and communicating with the space within said tank and without said cup; there being an opening in the bottom of said cup cooperating with said tube to admit liquid into said tube; means for sealing said tube into the walls of said cup; and means for visually ascertaining the level of liquid rising within said tube.

5. A liquid level indicator for a closed tank, comprising: a cup adapted to project downwardly into the closed tank, said cup being liquid tight except at its upper end; a transparent tube traversing said cup and communicating with the space within said tank and without said cup; there being an opening in the bottom of said cup cooperating with said tube to admit liquid into said tube; and means for sealing said tube into the walls of said cup in such manner that when said cup is partially immersed in a liquid said liquid rises in said tube and is excluded from the interior of said cup.

In witness that I claim the foregoing I have hereunto subscribed my name this 2nd day of May, 1928.

CHARLES F. H. BOHNHARDT.